United States Patent [19]

Zinkann et al.

[11] Patent Number: 4,821,537
[45] Date of Patent: Apr. 18, 1989

[54] WASHING MACHINE OR WASHING DRYING MACHINE WITH DEVICES TO AVOID LOSSES OF WASHING AGENT

[75] Inventors: Peter Zinkann, Gütersloh; Wilfried Hüttemann, Bielefeld; Hans Fey; Friedrich W. Stork, both of Gütersloh; Rudolf Herden, Herzebrock; Wilfried Schultz, Gütersloh, all of Fed. Rep. of Germany

[73] Assignee: Miele & Cie. GmbH & Co., Gütersloh, Fed. Rep. of Germany

[21] Appl. No.: 66,417

[22] PCT Filed: Oct. 2, 1986

[86] PCT No.: PCT/DE86/00400

§ 371 Date: Jun. 3, 1987

§ 102(e) Date: Jun. 3, 1987

[87] PCT Pub. No.: WO87/02078

PCT Pub. Date: Apr. 9, 1987

[30] Foreign Application Priority Data

Oct. 3, 1985 [DE] Fed. Rep. of Germany ....... 3535326
Nov. 16, 1985 [DE] Fed. Rep. of Germany ....... 3540741
Jan. 25, 1986 [DE] Fed. Rep. of Germany ....... 3602232
Jan. 25, 1986 [DE] Fed. Rep. of Germany ....... 3602217
Mar. 14, 1986 [DE] Fed. Rep. of Germany ....... 3608579

[51] Int. Cl.$^4$ .................................... D06F 39/08
[52] U.S. Cl. .................................... 68/208
[58] Field of Search .............. 8/158; 68/12 R, 17 R, 68/23.4, 207, 208; 137/571; 134/155, 186

[56] References Cited

U.S. PATENT DOCUMENTS 2,972,877  2/1961  Platt .
3,246,494  4/1966  Schwing ...................... 68/208 X
3,691,797  9/1972  Smith .......................... 68/23.4

FOREIGN PATENT DOCUMENTS 1912519  3/1963  Fed. Rep. of Germany .
6923774  3/1970  Fed. Rep. of Germany .
7813695  8/1978  Fed. Rep. of Germany .
2818464  11/1979 Fed. Rep. of Germany ........ 68/208
2712093  12/1980 Fed. Rep. of Germany ........ 68/208
3106604  3/1982  Fed. Rep. of Germany .
3119340  12/1982 Fed. Rep. of Germany ........ 68/208
2142023  1/1973  France .
 739689  11/1955 United Kingdom .................. 68/208
2099462  12/1982 United Kingdom .

Primary Examiner—Philip R. Coe
Attorney, Agent, or Firm—Nils H. Ljungman

[57] ABSTRACT

A washing machine which includes a wash tub for receiving water and articles to be washed, a drain connected to the wash tub, a float disposed within the drain, a drain water reservoir for receiving and storing water removed from the wash tub through the drain and for providing back pressure on the float, and a pump for pumping water from the wash tub, through the drain, and into the drain water reservoir.

16 Claims, 4 Drawing Sheets

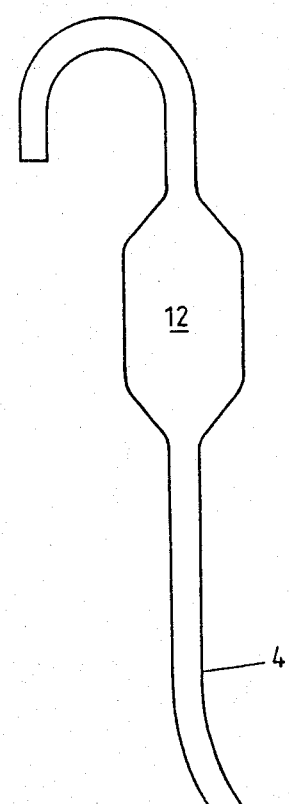
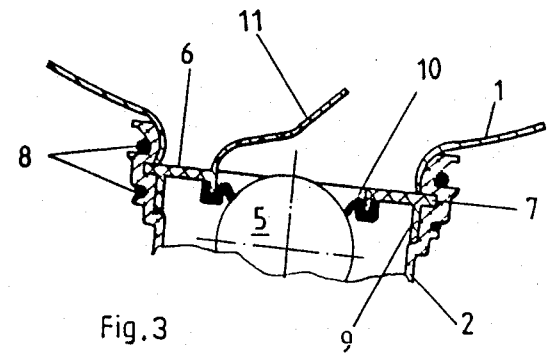
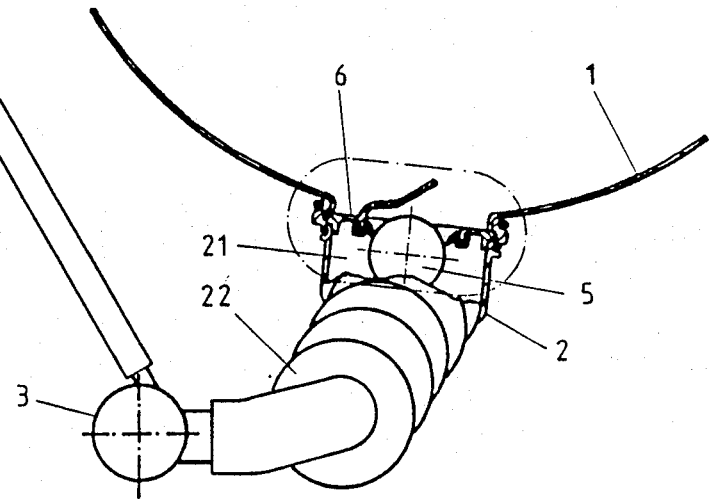
Fig. 3
Fig. 2

WASHING MACHINE OR WASHING DRYING MACHINE WITH DEVICES TO AVOID LOSSES OF WASHING AGENT

BACKGROUND OF THE INVENTION

1. Field of the Invention

This invention relates to a washing machine or a combination wash dryer with an automatic detergent dispensing apparatus and a washwater pump which evacuates the washwater via a drain hose, and with equipment to prevent detergent losses. An advantageous method to control this washing machine is also described.

2. Description of the Prior Art

A longstanding goal of the washing machine industry has been to keep the amount of detergent not used in the washing process as low as possible. A number of different proposals have been made to solve this probem. DE-OS No. 31 06 604 and DE-GM No. 78 13 695 describe arrangements in which there is a so-called float in the washtub drain, which floats upward as a result of the backpressure of the remaining water in the drain hose, and is thereby intended to close the drain opening.

Such closing devices have not been realized in practice, however, since it has proven to be very difficult to achieve a really tight seal at the drain opening. Even a small leak sooner or later leads to an equalization of the remaining water column in the drain hose, i.e. the water gets into the tub and the bouyancy of the hollow body is no longer sufficient to achieve a secure closing of the drain opening. In the subsequent wash cycle, nevertheless, detergent can still get through the drain opening into the sump of the machine, and therefore becomes useless for the washing process.

Another valve configuration for the same purpose is described in DE-PS No. 27 12 093. The flap valve described therein is expensive, and is complicated to install in the washtub drain. Furthermore, lint or similar substances can easily prevent a complete closing.

The prior art also includes an additional reservoir in the drain system of a washing machine, so that there will always be enough water remaining in the drain system to prevent the dispensed detergent from sinking down into the drain.

But even this measure has proven ineffective. The detergent, generally in granular form, still gets into the area of the drain before it is dissolved, and is removed unused during drainage.

Thus all previous efforts to prevent detergent losses in the manner described above have been unsuccessful.

OBJECT OF THE INVENTION

The general object of the invention is to design a washing machine or a comination washer-dryer of the type described above with a closing apparatus which creates a tight seal which operates securely and closes the washtub drain tightly. The object of the invention also includes a suitable process to control this washing machine.

SUMMARY OF THE INVENTION

It has been shown that only by means of the characteristics combined in accordance with the invention can an apparatus be created which can be used in practice, and operates securely to prevent the loss of unused detergent. By means of the additional water reservoir in the drain tube, and by means of the special configuration of the washtub drain, the float advantageously has sufficient bouyancy to work together with the seal arrangement for a secure closing of the washtub drain opening.

The integration of the water reservoir in the anti-return portion of the machine has the advantage that no longer must be an additional part be interposed in the drain hose of the machine. In addition, the water reservoir is advantageously installed inside the machine housing, since such a location prevents manipulations which might otherwise be made on a part located outside the housing, and which might adversely affect the proper operation of the valve apparatus.

On account of the special structure of the float, the penetration of water into its inside is prevented, and more economical materials and fabrication processes can be used for the manufacture of such a float.

Before the beginning of a wash cycle during which detergent will be added, it is appropriate to turn on the washwater pump for a short period of time, to remove any water in the washtub into the drain system. Since under some circumstances, this measure alone is not sufficient, the additional measures described herein produce a further improvement, by means of which the force applied to the float is guaranteed or increased. The can advantageously be achieved by the variants described herein.

Safety precautions should also be taken to prevent an undesired activation of the additional control steps, if such an activation is undesirable for technical reasons.

One embodiment of the invention is illustrated schematically in the accompanying drawings.

BRIEF DESCRIPTION OF THE DRAWINGS

FIG. 2 shows, in simplified form, the drain system of a drum-type washing machine of conventional construction, FIG. 3 shows the area of the washtub drain opening in cross section, as a detail.

DESCRIPTION OF THE PREFERRED EMBODIMENTS

Figure 8:
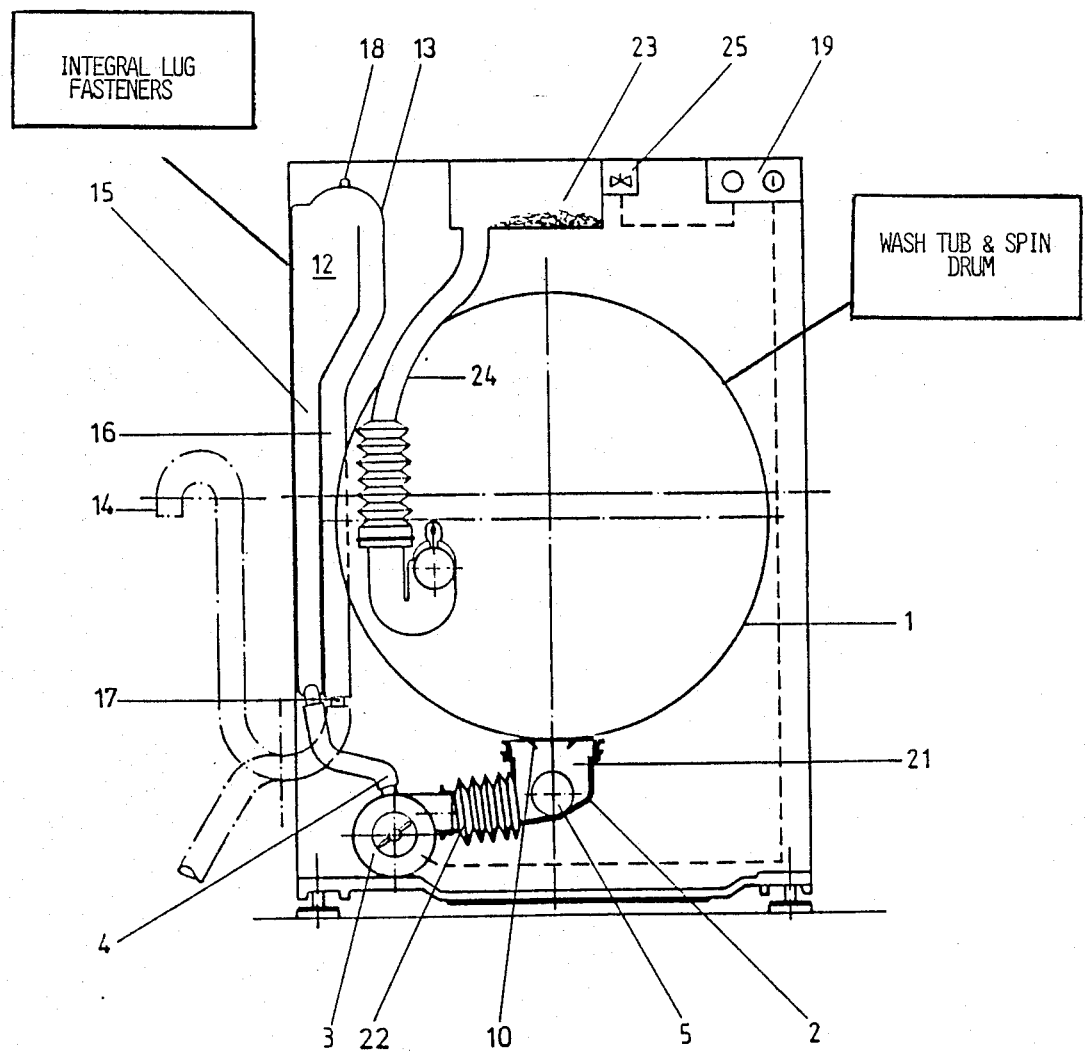
FIG. 8 is similar to FIG. 1, but shows additional elements utilized in preferred embodiments of the invention.

The washtub drain (2) in the form of a rubber hose is connected to the washtub (1) of a drum washing machine. The washtub drain (2) consists of the chamber (21) as well as the folding sleeve (22) and is advantageously constructed in one piece. The water is extracted from the washing machine by means of the washwater pump (3) and the drain hose (4). As is well known in the art, and as is shown in FIG. 8, the drum washing machine may also incorporate a spin drum utilized in connection with wash tub (1) which is generally mounted coaxial therewith.

There is a float (5) inside the chamber (21) of the washtub drain (2). In a preferred embodiment, it is designed as a hollow plastic body.

As shown in greater detail in FIG. 3, there is an insert (6) in the tub drain (2). With its circular rim (7), the insert (6) is buttoned into the washtub drain (2). The washtub drain (2) and the insert (6) can be fastened in the conventional manner using clamping rings (8).

The insert (6) has a cylindrical extension (9) which points downward, which provides a tight seat in the elastic tub drain (2).

Fastened to the underside, in the area of the drain opening of the insert (6) is a seal element (10), which exhibits a sealing lip directed inward toward the drain opening. The seal element (10) can be buttoned as shown on the insert (6) in a known manner, however a one-piece embodiment would also be conceivable, where the sealing lip is formed directly on the insert (6).

On the upper side of the insert (6), there is a guide element (11), which has the task of breaking up the sheet of water which may form during the spin cycle, and also makes certain that the detergent dispensed is kept away from the critical region of the drain opening, at least to some extent.

In the drain state, the washwater pump (3) transports the water via the drain hose (4), the anti-return section (13) and the so-called drain elbow (14) into the public sewer system.

The anti-return section (13) is a one-piece plastic part, in which there are passages (15 and 16). On its lower end, the anti-return section (13) has connection pipes (17) for the hoses carrying water, and a connection pipe (18) at its upper end for a ventilation hose. The anti-return section (13) is connected to fastening lugs formed on one inside wall of the housing generally shown in FIG. 8.

In the upper region of the anti-return section (13), the water reservoir (12) is formed by an expansion which increases the volume in the antireturn section (13) which acts during the pumping out of the washwater as an ascending passage (15).

For the proper operation of the ball valve, it is important that the water reservoir (12) be located as high as possible inside the machine, and that the water column which forms in the passage (15) after the washwater pump is turned off remain as high as possible, so that the float (5) is pushed by the backflowing water with a strong force against the seal element (10) located in the washtub drain. For this reason, the water reservoir (12) should be located in the upper overflow area from duct (15) to duct (16).

Figure 4:
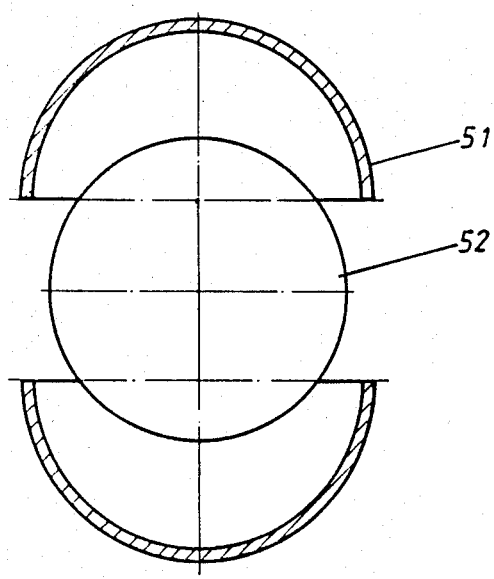
FIG. 4 shows a spherical float with its filler before being joined together, in partial cross section.

FIG. 4 shows a float which consists of two hemispheres (51) and a filler (52) of foamed material. In relation to the material for the filler, care should be taken that it has a very low specific gravity, significantly less than one, and that its absorption capacity is also very low. The hemispheres (51) can thereby consist of a high-grade thermoplastic material, while the filler (52) can be made of a foamed plastic such as styropor or a similar material. The hemispheres (51) are joined together to include the filler (52), preferably by welding their contact surfaces. Here too, a mechanical snap connection would be conceivable, or a water-resistant adhesive connection in the area of the shell edges in contact with one another.

Figure 5:
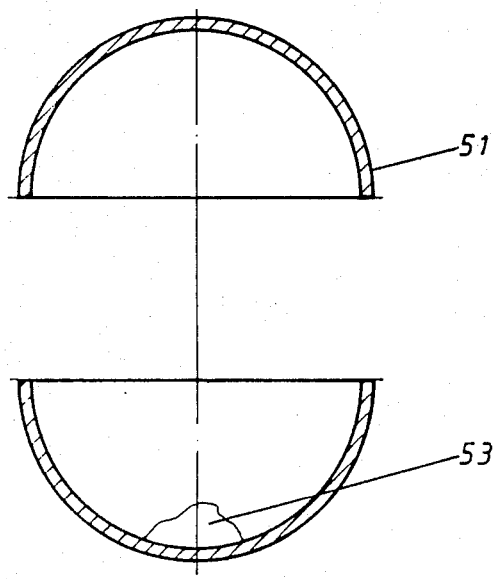
FIG. 5 shows a float similar to the one in FIG. 4, in which the filler is formed by the injection of a two-component foam.
Figure 7:
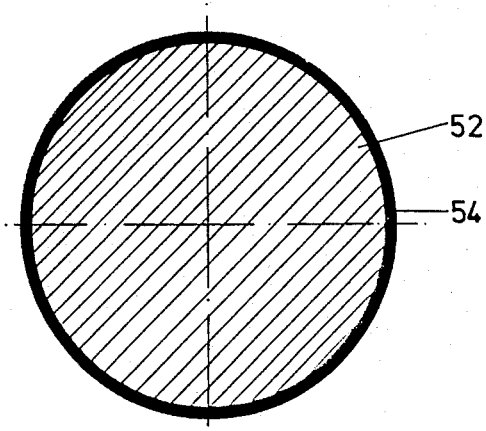

In the embodiment illustrated in FIG. 5, the filler (52) is formed by the injection of a two-component foam (53) before the shells (51) are joined together. During or after the connection of the two hemispheric shells (51) with one another, a chemical-thermal reaction takes place inside the closed float, by means of which the two-component foam (53) expands and thus fills up the inside of the float.

If a two-component foam (53) is available which is not hygroscopic, it can also be subsequently injected into the hollow float.

Figure 6:
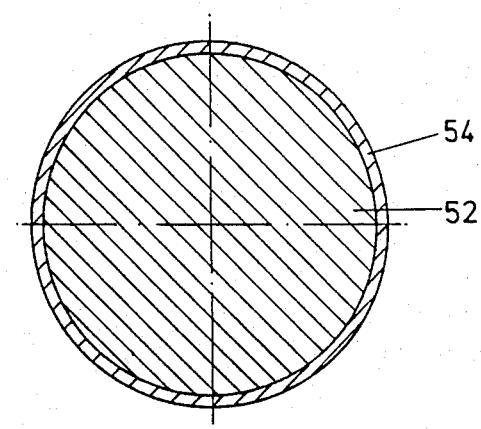
FIGS. 6 and 7 show a float, in cross section, with a filler and a coating.

In the embodiment illustrated in FIG. 6, first the filler (52) is fabricated from a foamed plastic, and then the coating (54) is formed by immersion, sintering, spraying or a similar method. Finally, for the fabrication of a suitable float, a multicomponent injection molding process of the prior art can also be used. In this case, an economical plastic is used internally as the filler (52), and is then provided with an external coating (54) of a higher-grade thermoplastic material.

The fundamental principle of the invention is explained in greater detail below, with reference to the accompanying FIG. 2: At the end of the washing cycle, the washwater pump (3) is turned off, and the remaining water flowing back from the drain tube (4) and from its water reservoir (12) reaches the washtub drain (2). The float (5) is thereby pushed upward with sufficient buoyancy and presses against the seal housing of the seal element (10). On account of the relatively soft sealing lip of the seal element (10), a secure seal of the float (5) inside the drain opening is achieved. During the subsequent washing cycle, the detergent dispensed can no longer get into the drain system of the machine and be pumped out unused.

After the machine has not been operated for a rather long period of time, it may be that in the period between two wash cycles, unavoidable small leaks can allow water to penetrate from the drain system into the washtub. Then the buoyancy of the float could be weakened, and the closing action in the washwater tank drain would not occur. A remedy can consist of taking precautions in the control equipment of the washing machine, so that the washwater pump (33) of the machine is turned on for a short time, e.g. for 2-6 seconds, at the beginning of each new wash cycle. The remaining water in the machine is thereby pushed into the drain tube (4) and during the backflow, the float (5) is again pressed into the sealing seat.

Figure 1:
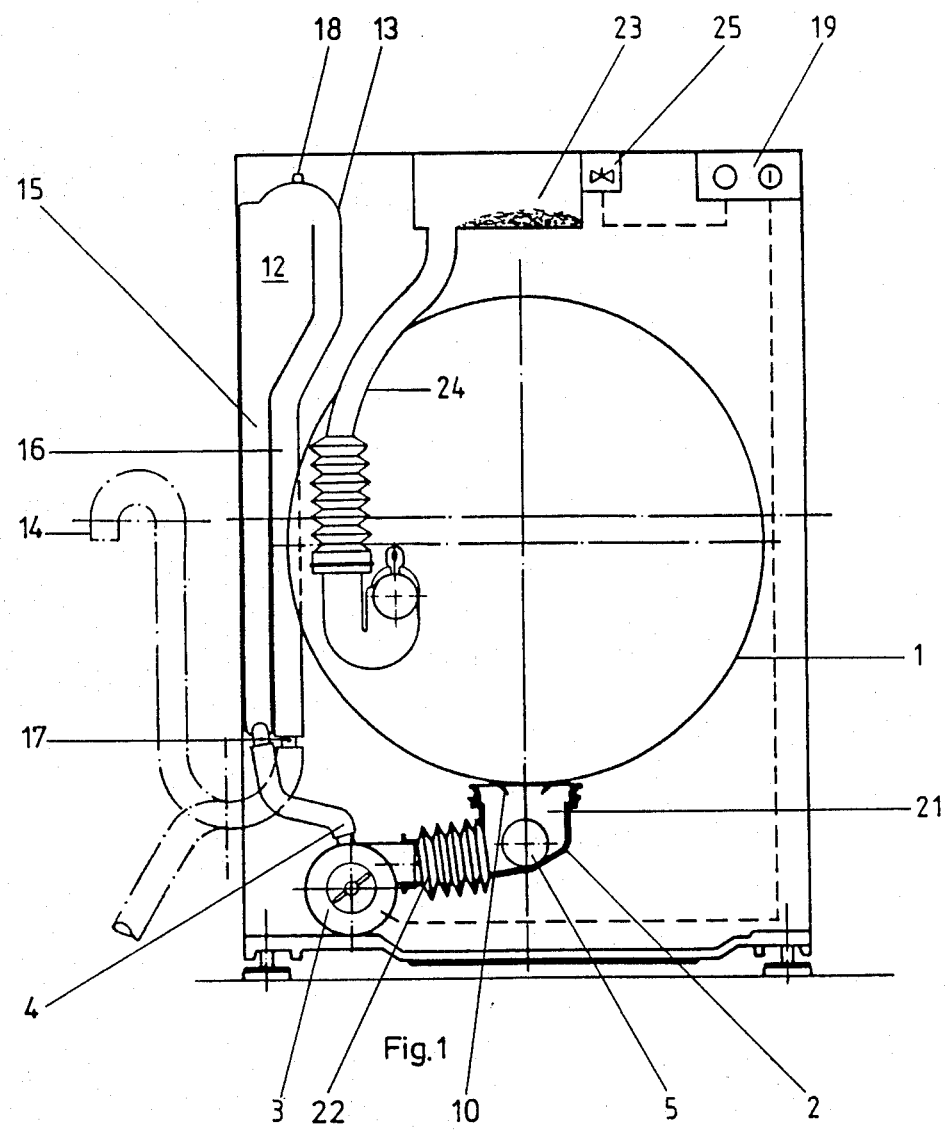
FIG. 1 shows a head-on view of a washing machine in simplified form with the elements necessary for the explanation of the invention.

The operation of the apparatus illustrated in FIG. 1 is described below: The sequence of the machine wash cycle is controlled by the program control apparatus (19). The detergent required for the washing process is added in a known manner via the detergent dispenser (23) and the connection hose (24) to the tub (1). A solenoid valve (25) or a group of solenoid valves is located in the water feed line, and controls the addition of fresh water to the machine in the conventional manner.

As a rule, the washing liquid is pumped out at the end of a wash cycle. The washwater pump (3) turned on by the programm control apparatus (19) drains the washwater from the machine via the passage (15). If the washwater pump (3) is turned off, then the remaining water flows out of the water reservoir (12) and the passage (15) through the washwater pump back into the chamber (21) of the tub drain (2) and pushes the float (5) into the seal element (10). The tub drain is thereby closed, and during the subsequent wash cycle, no detergent can escape unused into the drain system. In this case, the following control measures can be adopted to replace or increase the water column in the passageway (15).

Before a program segment which involves the addition of detergents, e.g. the pre-wash or the main wash, the solenoid valve (25) of the program control apparatus (19) is turned on for a short time and fresh water is transported into the tub (1) via a bypass (not shown in any further detail) or a dispensing chamber of the detergent dispenser (23) containing no detergent. After a delay period, which guarantees the arrival of this water in the bottom of the tub (1), the program control apparatus (19) turns on the washwater pump (3) for a short time, so that the water is pulled out of the tub (1) into the drain system. The quantity of fresh water admitted and the time the solenoid valve (25) and the washwater pump (3) are turned on is selected so that the water column in the passage (15) can form up to the upper edge of the water reservoir (12). It may suffice for the solenoid valve (25) to be turned on for at least 3 seconds, and after at least 10 seconds from the time the solenoid valve (25) is turned on, to turn on the washwater pump (3) for 1 second.

In another embodiment, while the wash cycle is in progress, the solenoid valve (25) can be turned on for a short time at the end of a program segment, e.g. at the end of the pre-wash. The brief pumping-out by turning on the washwater pump (3) can then occur at the beginning of the subsequent program segment, the main wash.

Another advantageous measure can consist of turning on the solenoid valve (25) and the washwater pump (3) in the manner described above after the end of the washing process itself, after the spin.

Another advantageous precaution can be taken at the end of the wash program, of the "spin" segment, by keeping the washwater pump (3) in a status where it can be turned on until the washtub actually comes to a stop, and not turning it off as usual with the spin motor. That prevents any leaks caused by vibrations during the run-out of the drum caused by movements of the float (5) in the seal apparatus.

It can also occur, however, that the washwater pump (3) is turned on for a short period at an undesirable point. If the user has started a wash cycle in which the detergent has already been dispensed, and if, for example, he restarts the machine for a modified cycle, then all of the detergent would be sucked into the drain sump, without being used for a washing process. Here, a means is created whereby the program control apparatus (19) of the machine prevents the short-term operation of the washwater pump (3) if, as described above, the detergent has already been dispensed. In the practical embodiment, the program control apparatus (19) can thereby contain a memory, e.g. an NVRAM, which stores the most recent program status and continues the program, omitting the activation of the washwater pump (3) and of the solenoid valve (25). This effectively prevents an unintentional discharge of detergents.

What is claimed is:
1. A washing machine, comprising:
a wash tub for receiving water and articles to be washed;
a drain connected to said wash tub;
a float disposed within said drain;
drain water reservoir means for receiving and storing water removed from said wash tub through said drain and for providing back pressure on said float;
said drain water reservoir means comprising a storage reservoir having a cross sectional area which is substantially greater than the cross sectional area of said drain;
said storage reservoir extending to at least an upper portion of said wash tub; and
pump means for pumping water from said wash tub, through said drain, and into said drain water reservoir means.

2. The washing machine according to claim 1, further comprising a sealing element disposed within said drain adjacent said float.

3. The washing machine according to claim 2, wherein said sealing element comprises an insert having a sealing lip extending away from said wash tub.

4. The washing machine according to claim 3, wherein said sealing element further comprises a circular rim adapted to be buttoned into said drain and a cylindrical extension extending into said drain.

5. The washing machine according to claim 3, wherein said drain comprises an integral rubber hose having a chamber for enclosing said float and a folding sleeve.

6. The washing machine according to claim 3, wherein said washing machine further comprises anti-return means for preventing the return of drain water ejected from said washing machine, said anti-return means being disposed within said washing machine, and wherein said drain water reservoir means is formed is an integral portion of said anti-return means.

7. The washing machine according to claim 1, wherein said drain comprises an integral rubber hose having a chamber for enclosing said float and a folding sleeve.

8. The washing machine according to claim 1, wherein said washing machine further comprises anti-return means for preventing the return of drain water ejected from said washing machine, said anti-return means being disposed within said washing machine, and wherein said drain water reservoir means is formed as an integral portion of said anti-return means.

9. A washing machine, comprising:
a wash tub for receiving water and articles to be washed;
a drain connected to said wash tub;
a float disposed within said drain;
drain water reservoir means for receiving and storing water removed from said wash tub through said drain and for providing back pressure on said float;
pump means for pumping water from said wash tub, through said drain, and into said drain water reservoir means;
a sealing element disposed within said drain adjacent said float;
said sealing element comprising an insert having a sealing lip extending away from said wash tub; and
anti-return means for preventing the return of drain water ejected from said washing machine, said anti-return means being disposed within said washing machine, and wherein said drain water reservoir means is formed as an integral portion of said anti-return means;
said anti-return means comprising two substantially vertical passages disposed substantially adjacent to one another, a first of said two passages being an ascending passage for receiving water from said drain, wherein the upper portion of said ascending passage is expanded to form said drain-water reservoir means, and wherein said washing machine further comprises a housing, said anti-return means being fastened to the interior of said housing and expanded in an inward direction so as to form said drain water reservoir means.

10. The washing machine according to claim 9, wherein said anti-return means further comprises an integral plastic member having at least two water pipe connections at the lower end thereof and at least one ventilation hose connection at the upper end thereof, said integral plastic member being provided with integrally formed fastening lugs.

11. The washing machine according to claim 11, wherein said float comprises a foamed material having a low specific weight and additionally a low capacity to absorb liquid.

12. The washing machine according to claim 11, wherein said float additionally comprises two plastic hemispheres joined together and enclosing said foamed material.

13. The washing machine according to claim 12, wherein said foamed material further comprises a two component foam placed in said hemispheres prior to joining in an amount sufficient to fill said float, and wherein said hemispheres are joined by means of a chemical-thermal reaction.

14. The washing machine according to claim 11, wherein said float further comprises an outside elastomeric coating surrounding said foamed material.

15. The washing machine according to claim 11, wherein said foamed material is an economical foamed material and wherein said float additionally comprises an exterior coating of a high grade thermoplastic material applied by means of a multi-component process.

16. A washing machine, comprising:
a wash tub for receiving water and articles to be washed;
a drain connected to said wash tub;
a float disposed within said drain;
drain water reservoir means for receiving and storing water removed from said wash tub through said drain and for providing back pressure on said float;
said drain water reservoir means comprising a storage reservoir having a volume capacity charge per linear unit measure of change in water level which is substantially greater than the volume capacity charge per linear unit measure of change in water level of said drain;
said storage reservoir extending to at least an upper portion of said wash tub; and
pump means for pumping water from said wash tub, through said drain, and into said drain water reservoir means.

* * * * *